US012243388B2

(12) United States Patent
Richards et al.

(10) Patent No.: US 12,243,388 B2
(45) Date of Patent: Mar. 4, 2025

(54) PRE-AUTHORIZED CASINO CREDIT INSTRUMENT

(71) Applicant: Everi Payments Inc., Austin, TX (US)

(72) Inventors: Timothy Brian Richards, Las Vegas, NV (US); Kurt Douglas Sullivan, Henderson, NV (US)

(73) Assignee: Everi Payments Inc., Las Vegas, NV (US)

( * ) Notice: Subject to any disclaimer, the term of this patent is extended or adjusted under 35 U.S.C. 154(b) by 0 days.

(21) Appl. No.: 18/618,337

(22) Filed: Mar. 27, 2024

(65) Prior Publication Data

US 2024/0312306 A1 Sep. 19, 2024

Related U.S. Application Data

(63) Continuation of application No. 18/488,834, filed on Oct. 17, 2023, now Pat. No. 11,948,429, which is a continuation of application No. 18/089,786, filed on Dec. 28, 2022, now Pat. No. 11,804,102, which is a continuation of application No. 17/156,953, filed on Jan. 25, 2021, now Pat. No. 11,544,997, which is a continuation of application No. 16/742,012, filed on Jan. 14, 2020, now Pat. No. 10,916,093, which is a continuation of application No. 16/436,198, filed on Jun. 10, 2019, now Pat. No. 10,916,092, which is a continuation of application No. 15/875,566, filed on Jan. 19, 2018, now Pat. No. 10,332,345, which is a continuation of application No. 15/073,806, filed on Mar. 18, 2016, now Pat. No. 9,875,612, which is a
(Continued)

(51) Int. Cl.
*G07F 17/32* (2006.01)

(52) U.S. Cl.
CPC ................................ *G07F 17/3244* (2013.01)

(58) Field of Classification Search
CPC .................................................. G07F 17/3244
See application file for complete search history.

(56) References Cited

U.S. PATENT DOCUMENTS 4,689,742 A 8/1987 Troy et al.
4,764,666 A 8/1988 Bergeron
(Continued)

FOREIGN PATENT DOCUMENTS

EP 1107196 6/2001
GB 2380687 4/2003
(Continued)

*Primary Examiner* — David L Lewis
*Assistant Examiner* — Shauna-Kay Hall
(74) *Attorney, Agent, or Firm* — Snell & Wilmer

(57) ABSTRACT

A casino credit access instrument comprises a source of funds for a player, such as for placing wagers to play casino-style games or to purchase other goods or services. The instrument defines a period of timed during which credit may be accessed up to a predetermined amount, defines a redemption period during which any accessed credit may be re-paid, and defines settlement terms if the instrument is not redeemed. Controls may be utilized which control access to the credit. Credit may be granted based upon financial collateral, which collateral may be executed upon to settle the instrument. The instrument provides a convenient source of funding for players at low risk to the casino or other lender.

18 Claims, 4 Drawing Sheets

Related U.S. Application Data continuation of application No. 13/473,895, filed on May 17, 2012, now Pat. No. 9,293,002.

(56) References Cited

U.S. PATENT DOCUMENTS

| | | | |
|---|---|---|---|
| 4,882,473 | A | 11/1989 | Bergeron et al. |
| 5,038,022 | A | 8/1991 | Lucero |
| 5,179,517 | A | 1/1993 | Sarbin et al. |
| 5,265,874 | A | 11/1993 | Dickinson et al. |
| 5,321,241 | A | 6/1994 | Craine |
| 5,429,361 | A | 7/1995 | Raven et al. |
| 5,457,306 | A | 10/1995 | Lucero |
| 5,470,079 | A | 11/1995 | LeStrange et al. |
| 5,613,912 | A | 3/1997 | Slater |
| 5,642,160 | A | 6/1997 | Bennett |
| 5,663,546 | A | 9/1997 | Cucinotta et al. |
| 5,679,938 | A | 10/1997 | Templeton et al. |
| 5,741,183 | A | 4/1998 | Acres et al. |
| 5,754,655 | A | 5/1998 | Hughes et al. |
| 5,766,075 | A | 6/1998 | Cook et al. |
| 5,770,533 | A | 6/1998 | Franchi |
| 5,811,772 | A | 9/1998 | Lucero |
| 5,813,912 | A | 9/1998 | Shultz |
| 5,864,623 | A | 1/1999 | Messina et al. |
| 5,902,983 | A | 5/1999 | Crevelt et al. |
| 5,919,091 | A | 7/1999 | Bell et al. |
| 5,952,640 | A | 9/1999 | Lucero |
| 5,959,277 | A | 9/1999 | Lucero |
| 5,991,410 | A | 11/1999 | Albert et al. |
| 5,999,624 | A | 12/1999 | Hopkins |
| 6,001,016 | A | 12/1999 | Walker et al. |
| 6,044,360 | A | 3/2000 | Picciallo |
| 6,048,269 | A | 4/2000 | Burns et al. |
| 6,048,271 | A | 4/2000 | Barcelou |
| 6,064,987 | A | 5/2000 | Walker et al. |
| 6,081,792 | A | 6/2000 | Cucinotta et al. |
| 6,124,947 | A | 9/2000 | Seo |
| 6,144,948 | A | 11/2000 | Walker et al. |
| 6,162,122 | A | 12/2000 | Acres et al. |
| 6,168,522 | B1 | 1/2001 | Walker et al. |
| 6,244,958 | B1 | 6/2001 | Acres |
| 6,247,643 | B1 | 6/2001 | Lucero |
| 6,275,991 | B1 | 8/2001 | Erlin |
| 6,293,866 | B1 | 9/2001 | Walker et al. |
| 6,302,793 | B1 | 10/2001 | Fertitta et al. |
| 6,347,738 | B1 | 2/2002 | Crevelt et al. |
| 6,352,205 | B1 | 3/2002 | Mullins et al. |
| 6,361,437 | B1 | 3/2002 | Walker et al. |
| 6,394,907 | B1 | 5/2002 | Rowe |
| 6,409,595 | B1 | 6/2002 | Uihlein et al. |
| 6,431,983 | B2 | 8/2002 | Acres |
| RE37,885 | E | 10/2002 | Acres et al. |
| 6,486,768 | B1 | 11/2002 | French et al. |
| 6,487,284 | B1 | 11/2002 | Campbell |
| 6,505,772 | B1 | 1/2003 | Mollett et al. |
| 6,547,131 | B1 | 4/2003 | Foodman et al. |
| 6,575,832 | B1 | 6/2003 | Manfredi et al. |
| 6,577,733 | B1 | 6/2003 | Charrin et al. |
| 6,579,179 | B2 | 6/2003 | Poole et al. |
| 6,585,598 | B2 | 7/2003 | Nguyen et al. |
| 6,601,040 | B1 | 7/2003 | Kolls |
| 6,607,441 | B1 | 8/2003 | Acres |
| 6,628,939 | B2 | 9/2003 | Paulsen et al. |
| 6,675,152 | B1 | 1/2004 | Prasad et al. |
| 6,676,522 | B2 | 1/2004 | Rowe et al. |
| 6,682,421 | B1 | 1/2004 | Rowe et al. |
| 6,709,333 | B1 | 3/2004 | Bradford et al. |
| 6,739,972 | B2 | 5/2004 | Flanagan-Parks et al. |
| 6,800,029 | B2 | 10/2004 | Rowe et al. |
| 6,843,412 | B1 | 1/2005 | Sanford |
| 6,846,238 | B2 | 1/2005 | Wells |
| 6,851,607 | B2 | 2/2005 | Orus et al. |
| 6,852,031 | B1 | 2/2005 | Rowe |
| 6,866,586 | B2 | 3/2005 | Oberberger et al. |
| 6,890,258 | B2 | 5/2005 | Weiss |
| 6,951,302 | B2 | 10/2005 | Potts |
| 6,997,807 | B2 | 2/2006 | Weiss |
| 7,003,496 | B2 | 2/2006 | Ishii et al. |
| 7,094,149 | B2 | 8/2006 | Walker et al. |
| 7,168,089 | B2 | 1/2007 | Nguyen et al. |
| 7,311,605 | B2 | 12/2007 | Moser |
| 7,461,780 | B2 | 12/2008 | Potts et al. |
| 7,771,277 | B2 | 8/2010 | Chamberlain et al. |
| 7,819,742 | B2 | 10/2010 | Chamberlain et al. |
| 7,828,646 | B2 | 11/2010 | Franks, Jr. |
| 7,922,581 | B2 | 4/2011 | Potts |
| 7,976,384 | B2 | 7/2011 | Griswold |
| 8,025,216 | B2 | 9/2011 | Potts et al. |
| 8,096,872 | B2 | 1/2012 | Walker et al. |
| 8,140,434 | B2 | 3/2012 | DeCristoforo |
| 8,393,955 | B2 | 3/2013 | Arezina et al. |
| 8,556,707 | B2 | 10/2013 | Potts et al. |
| 8,992,305 | B2 | 3/2015 | Sanford et al. |
| 9,711,004 | B1 | 7/2017 | Ellis |
| 10,235,837 | B2 | 3/2019 | Ellis |
| 2001/0022849 | A1 | 9/2001 | Simonoff |
| 2001/0050311 | A1 | 12/2001 | Avellino |
| 2002/0002075 | A1 | 1/2002 | Rowe |
| 2002/0039921 | A1 | 4/2002 | Rowe et al. |
| 2002/0039923 | A1 | 4/2002 | Cannon et al. |
| 2002/0045476 | A1 | 4/2002 | Poole et al. |
| 2002/0068624 | A1 * | 6/2002 | Ellis ........................ G07F 17/32 463/25 |
| 2002/0103027 | A1 | 8/2002 | Rowe et al. |
| 2002/0107072 | A1 | 8/2002 | Giobbi |
| 2002/0132664 | A1 | 9/2002 | Miller et al. |
| 2002/0147047 | A1 | 10/2002 | Letovsky et al. |
| 2002/0177479 | A1 | 11/2002 | Walker et al. |
| 2003/0004871 | A1 | 1/2003 | Rowe |
| 2003/0022719 | A1 * | 1/2003 | Donald .................. G06Q 50/34 463/42 |
| 2003/0033534 | A1 | 2/2003 | Rand et al. |
| 2003/0036425 | A1 | 2/2003 | Kaminkow et al. |
| 2003/0045353 | A1 | 3/2003 | Paulsen et al. |
| 2003/0078094 | A1 | 4/2003 | Gatto et al. |
| 2003/0087692 | A1 | 5/2003 | Weiss |
| 2003/0104865 | A1 | 6/2003 | Itkis et al. |
| 2003/0106769 | A1 | 6/2003 | Weiss |
| 2003/0119585 | A1 | 6/2003 | Walker et al. |
| 2003/0162593 | A1 | 8/2003 | Griswold |
| 2003/0176218 | A1 | 9/2003 | LeMay et al. |
| 2003/0186747 | A1 | 10/2003 | Nguyen et al. |
| 2003/0211883 | A1 | 11/2003 | Potts |
| 2003/0222153 | A1 | 12/2003 | Pentz et al. |
| 2003/0228902 | A1 | 12/2003 | Walker et al. |
| 2003/0236749 | A1 | 12/2003 | Shergalis |
| 2004/0053693 | A1 | 3/2004 | An |
| 2004/0063494 | A1 | 4/2004 | Oram et al. |
| 2004/0093303 | A1 | 5/2004 | Picciallo |
| 2004/0162135 | A1 | 8/2004 | Flanagan-Parks et al. |
| 2004/0173673 | A1 | 9/2004 | Potts |
| 2004/0214643 | A1 | 10/2004 | Parrott et al. |
| 2004/0229671 | A1 | 11/2004 | Stronach et al. |
| 2005/0009600 | A1 | 1/2005 | Rowe et al. |
| 2005/0054417 | A1 | 3/2005 | Parrott et al. |
| 2005/0054446 | A1 | 3/2005 | Kammler et al. |
| 2005/0080728 | A1 | 4/2005 | Sobek |
| 2005/0096124 | A1 | 5/2005 | Stronach |
| 2005/0107155 | A1 | 5/2005 | Potts et al. |
| 2005/0107156 | A1 | 5/2005 | Potts et al. |
| 2005/0187012 | A1 | 8/2005 | Walker et al. |
| 2005/0289056 | A1 | 12/2005 | Guinn |
| 2006/0052153 | A1 | 3/2006 | Vlazny et al. |
| 2006/0148559 | A1 | 7/2006 | Jordan et al. |
| 2006/0160610 | A1 | 7/2006 | Potts |
| 2007/0060309 | A1 | 3/2007 | Yankton et al. |
| 2007/0060310 | A1 | 3/2007 | Juds |
| 2007/0066386 | A1 | 3/2007 | Shields |
| 2007/0087818 | A1 | 4/2007 | Walker |
| 2007/0119924 | A1 | 5/2007 | Register, Jr. et al. |
| 2007/0155483 | A1 | 7/2007 | Walker et al. |
| 2007/0181676 | A1 | 8/2007 | Mateen et al. |
| 2007/0213124 | A1 | 9/2007 | Walker et al. |
| 2007/0225068 | A1 | 9/2007 | Weiss |

(56) References Cited

U.S. PATENT DOCUMENTS

| | | | |
|---|---|---|---|
| 2007/0278294 A1 | 12/2007 | Page | |
| 2008/0026835 A1 | 1/2008 | Yoshizawa | |
| 2008/0139303 A1 | 6/2008 | Patterson | |
| 2009/0029763 A1 | 1/2009 | Schwartz | |
| 2009/0318220 A1 | 12/2009 | Arezina et al. | |
| 2010/0197383 A1 | 8/2010 | Rader | |
| 2010/0222132 A1 | 9/2010 | Sanford et al. | |
| 2011/0065497 A1 | 3/2011 | Patterson, Jr. | |
| 2011/0077073 A1* | 3/2011 | Gagner | G07F 17/3255 463/25 |
| 2011/0207531 A1 | 8/2011 | Gagner et al. | |
| 2013/0073446 A1 | 3/2013 | Lee et al. | |
| 2014/0057703 A1 | 2/2014 | LeStrange et al. | |

FOREIGN PATENT DOCUMENTS

| | | |
|---|---|---|
| WO | WO93/23817 | 11/1993 |
| WO | WO94/16781 | 8/1994 |
| WO | WO97/13228 | 4/1997 |
| WO | WO01/57617 | 8/2001 |
| WO | WO2007/033055 | 3/2007 |

* cited by examiner

| | BIG CASINO | |
|---|---|---|
| 100 | PCAI No. | A 642 |
| 102 | Player | John Smith |
| 104 | Acct / Card No. | BC 8641 |
| 106 | Password | JohnBoy1 |
| 108 | Credit Limit | $5000.00 |
| 110 | Collateral | $2000.00 Check No. 642<br>$3000.00 Wells Fargo Acct. 6200 2612 1111 1111 |
| 112 | Credit Access Period | 3/1/12 1:00pm to 3/31/12 1:00pm |
| 114 | Credit Used<br>Credit Remaining | $1000.00 Casino Cage 242 3/6/12 3:42pm<br>$4000.00 |
| 116 | Redemption Period | 3/31/12 1:00pm to 4/10/12 1:00pm |
| 118 | Settlement | Notes:<br>Credit Card First |

FIG. 3

| | |
|---|---|
| Player | John Smith |
| Acct / Card No. | BC 8641 |
| PCAI | A 642<br>Open |
| PCAI | A 812<br>Closed |
| PCAI | A 410<br>In settlement |
| Open Funds | $2800.00 |

FIG. 4

PRE-AUTHORIZED CASINO CREDIT INSTRUMENT

RELATED APPLICATION DATA

This application is a continuation of U.S. application Ser. No. 18/488,834, filed Oct. 17, 2023, which is a continuation of U.S. application Ser. No. 18/089,786, filed Dec. 28, 2022, now U.S. Pat. No. 11,804,102, which is a continuation of U.S. application Ser. No. 17/156,953, filed Jan. 25, 2021, now U.S. Pat. No. 11,544,997, which is a continuation of U.S. application Ser. No. 16/742,012, filed Jan. 14, 2020, now U.S. Pat. No. 10,916,093, which is a continuation of U.S. application Ser. No. 16/436,198, filed Jun. 10, 2019, now U.S. Pat. No. 10,916,092, which is a continuation of U.S. application Ser. No. 15/875,566, filed, Jan. 19, 2018, now U.S. Pat. No. 10,332,345, which is a continuation of U.S. application Ser. No. 15/073,806, filed Mar. 18, 2016, now U.S. Pat. No. 9,875,612, which is a continuation of U.S. application Ser. No. 13/473,895, filed May 17, 2012, now U.S. Pat. No. 9,293,002, the contents of said prior applications being incorporated by reference as if set forth fully herein.

FIELD OF THE INVENTION

The present invention relates to methods of funding wager-based gaming activities.

BACKGROUND OF THE INVENTION

Traditional gaming machines such as slot machines required players to input coins in order to play the game. To avoid the need for customers to have coins or convert paper currency to coins in order to play the gaming machines, gaming machines were developed which accepted paper currency.

In order to reduce the need for gaming machines to dispense coins upon cash-out or for game wins, gaming machines were developed which dispense and receive monetary value tickets. Other gaming machine configurations have been proposed, including gaming machines which accept credit or debit cards.

In all cases, however, a player is required to provide monetary value in order to play the gaming machine. In some instances, however, a player may not have monetary funds readily available. In other instances, use of the funds may be cumbersome. For example, a player might have some funds available in a checking account but might then have to find a location to cash the check to receive currency to use to play a gaming machine.

Thus, additional solutions to the problems associated with funding of wager-based gaming remain desirable.

SUMMARY OF THE INVENTION

Embodiments of the invention include a casino gaming system, methods of funding wager-based gaming and related activities and a casino credit access instrument.

In one embodiment, the casino credit access instrument comprises a financial instrument which comprises a source of monetary funds which a player may selectively access. The funds may be used to fund wager-based gaming activities, such for placing a wager to play a casino game, and/or to pay for goods or services such as food, entertainment or lodging.

The casino credit access instrument may have a number of characteristics or features, including one or more of the following: (1) the casino credit access instrument may be associated with one or more players who may access credit there from, such as one or more players who are responsible for re-payment thereof, such as by use of certain collateral; (2) the casino credit access instrument may define a pre-determined credit amount, which amount preferably comprises a maximum amount of funds which the player may access or obtain; (3) the casino credit access instrument may only be issued or authorized for use after certain criteria have been verified or validated, such as if credit-worthiness criteria are met by the player; (4) the casino credit access instrument may define a period of time during which a player may access credit; (5) the casino credit access instrument may define a period of time during which it may be redeemed or be paid back by a player, preferably before it is settled; and (6) the casino credit access instrument may define terms of settlement, such as if it is not redeemed during the redemption period.

In accordance with one method of the invention, a player may apply for a casino credit access instrument, such as electronically or at a casino cage. The player may be required to provide collateral in exchange for the casino credit. If the casino credit access instrument is approved, the player may access credit there from, such as during the credit access period. For example, a player might access funds to be used at a gaming machine, at a gaming table, for online gaming or to pay for other goods or services. The player might access funds at various times and in various amounts, up to an aggregate maximum credit value. During the redemption period, the player may redeem or pay off any accessed credit. Any accessed credit which is not redeemed may be settled in accordance with defined settlement terms. Such a settlement may comprise execution upon the player's provided collateral.

In one embodiment, access to credit associated with the casino credit access instrument may be controlled by one or more controls. These controls may define, for example, velocity controls, transactional limits such as daily access limits or the like.

In one embodiment, aspects of the invention may be implemented by a casino gaming system which includes one or more gaming machines, gaming tables or other devices, or which enables on-line gaming. The casino gaming system may wholly or partially automate a casino credit access instrument application process, credit issuance process, redemption process and/or settlement process. In one embodiment, the casino credit access instrument may comprise or be represented by data, such as data stored in association with an account server.

In one embodiment of the invention, a casino or similar entity may underwrite issuance of the casino credit access instruments. In other embodiments, such may be underwritten or funded by third party entities such as banks or other lenders.

In accordance with the invention, players are provided with a convenient source of funds for casino-style wagering and other activities. At the same time, the player funding is offered at low risk and with well-defined terms, thus protecting the casino and/or lender.

Further objects, features, and advantages of the present invention over the prior art will become apparent from the detailed description of the drawings which follows, when considered with the attached figures.

DESCRIPTION OF THE DRAWINGS

FIG. 3 illustrates one example of a pre-authorized casino credit access instrument in accordance with the invention; and FIG. 4 illustrates one example of a player account having multiple pre-authorized casino credit access instruments associated therewith.

DETAILED DESCRIPTION OF THE INVENTION

Figure 1:
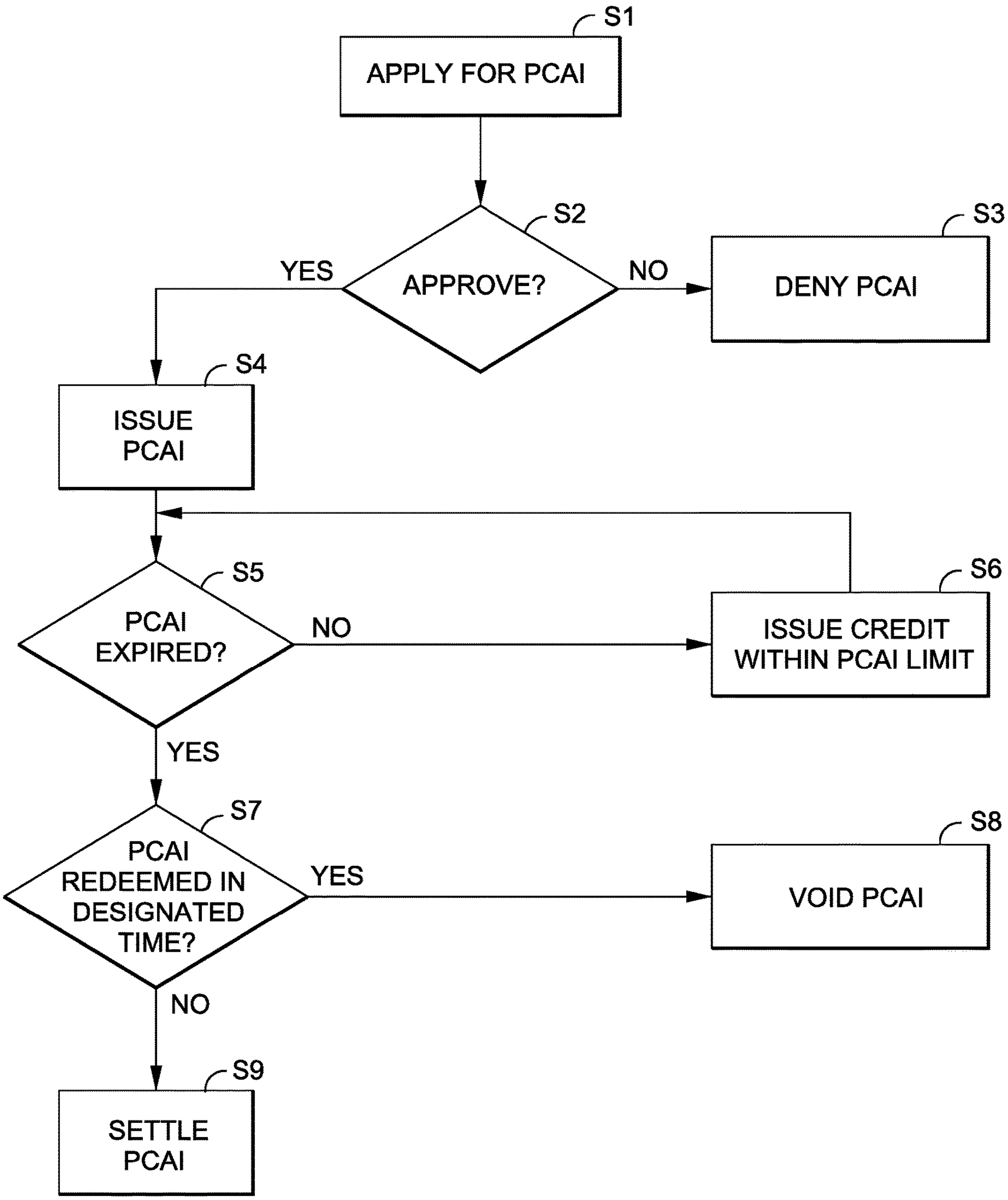
FIG. 1 is a flow diagram of a method of the present invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention include, but are not limited to, methods of funding wager-based gaming, casino gaming systems, and financial instruments and accounts. In one embodiment, the invention comprises a credit access instrument which permits a player to access funds for wager-based gaming, such as the play of one or more casino games.

One embodiment of the present invention comprises a financial instrument. The financial instrument may be represented by physical media, such as a printed document. However, in a preferred embodiment, the instrument is virtual.

In one embodiment, the financial instrument comprises a credit access instrument. The instrument comprises a source of monetary funds which a player may selectively access. The funds are preferably used to engage in wager-based gaming activities, such for placing a wager to play a casino game. As such, the financial instrument is referred to in a preferred embodiment as a casino credit access instrument. Of course, it will be appreciated that this terminology or name is not intended to limit the scope of the invention (for example, a player might access funds associated with a casino credit access instrument and use those funds to pay for food, entertainment, lodging or other goods or services).

As disclosed below, the financial instrument is preferably pre-authorized, meaning that it is issued or accessible only after certain authorizations or approvals have occurred. As such, the financial instrument is referred to in a preferred embodiment herein as a pre-authorized casino credit access instrument ("PCAI"). Again, this terminology or name is not intended to limit the scope of the invention (for example, the term "credit access instrument" may have the features of a PCAI herein, including being pre-authorized).

In a preferred embodiment, the PCAI has a number of characteristics or features. The PCAI may have one or more or all of the following characteristics and/or other characteristics.

First, in accordance with one embodiment of the invention, the PCAI is associated with one or more identified players. The PCAI may be associated with one or more players who are responsible for re-payment thereof, such as by use of certain collateral. The PCAI may also be associated with one or more players who may access credit there from, which players may be the same or different than those which provide the collateral.

Second, in accordance with an embodiment of the invention, the PCAI defines a pre-determined credit amount, which amount preferably comprises a maximum amount of funds which the player may access or obtain.

Third, in accordance with an embodiment of the invention, the PCAI is only issued or authorized for use after certain criteria have been verified or validated. Such might comprise determining if credit-worthiness criteria are met by the player. In a preferred embodiment, such may comprise or require the player to provide collateral for the desired credit amount.

Fourth, in accordance with an embodiment of the invention, the PCAI defines a period of time during which a player may access credit. Such a period of time may vary and may comprise, for example, hours or days or longer or shorter periods of time and provides a period of time during which the player may access credit from the particular PCAI.

Fifth, in one embodiment of the invention, the PCAI defines a period of time during which it may be redeemed or be paid back by a player, preferably before it is settled. The redemption period preferably occurs after the credit access period has expired and provides the player a period of time during which the player may pay off any credit which the player accessed during the credit access period.

Sixth, in one embodiment of the invention, if the PCAI is not redeemed during the redemption period, the PCAI defines terms of settlement, such actions to be taken against the player's collateral in order to pay off any credit which was accessed by the player. The terms of settlement may include the order in which collateral is utilized and/or the timing of settlement activities.

One embodiment of a method of issuing and using a PCAI will be described with reference to FIG. 1. In a first step S1, a player may apply for a PCAI. This may comprise the player providing information, such as filling out an electronic or physical form or the like. For example, the player might input required information into a computing system, such as via a kiosk, computer or the like. The player might also fill out a paper form. As part of the application process, a player might be permitted to seek certain PCAI terms, such as a desired credit limit, settlement terms, credit access period or the like (as disclosed below, such terms may be approved or might be modified by the provider).

The information which the player is required to provide may vary. In one embodiment, the information comprises information which identifies the player. This information may comprise, but is not limited to, the player's name, address, phone number, social security number, email address, driver's license, state issued ID car, government issued ID card, passport and the like.

In a preferred embodiment, as described in more detail below, the player preferably provides information regarding one or more collateral sources. In one embodiment, the collateral sources comprise one or more sources of monetary funds. Such may comprise, but are not limited to cash, a credit card, debit card, check or checking account, savings account or the like, or combinations thereof. However, such might comprise other types of collateral, such as title instruments (automobile title, house deed), personal property or the like, and variations of electronic approvals/transactions, such as signature debit transactions and the like.

In the case of sources of monetary funds, the collateral might comprise a check which is issued by the player in a certain amount of funds. In the case of financial accounts, the information may comprise information which identifies the account, such as a credit card number and card security code (such as the CVV), check or savings account number, bank name, routing or SWIFT code or the like.

In one embodiment, the application information is provided by the player to the PCAI issuer. Such may comprise, for example, a casino. However, the information could be provided to another party or be used by another party. For example, the player might provide the application information to a casino and the casino might send that information to an account underwriter, such as a bank or to an entity which performs credit checks.

In a step S2, it is determined whether to issue the PCAI. This step may comprise determining if the player's identity is confirmed, determining whether the player meets certain credit-worthiness standards and/or determining if the player has provided sufficient collateral. For example, the player's identity might be confirmed by verifying their driver's license or their address. The player's credit worthiness might be confirmed by checking the player's credit history or credit score, bank account (checking account/savings account) balances, check cashing history (such as relative to the PCAI offeror or even via a third party service). Lastly, as described below, a player may be required to provide collateral in a designated amount, such as an amount equal to the amount of credit which is to be authorized. If the one or more requirements are not met, then in a step S3, the PCAI may be denied. It is also possible for the terms of the PCAI to vary depending upon various criteria, such as the player's credit-worthiness. For example, a player may seek a PCAI with a credit limit of $5000, but after a credit check, the player might only be offered a PCAI with a credit limit of $2500.

If the requirements are met, then in a step S4, the PCAI may be issued or approved. In one embodiment, this step may also comprise determining the one or more characteristics of the PCAI, such as (but not limited to): (1) a maximum credit amount; (2) a credit access period; (3) a redemption or payoff period; and (4) settlement terms.

The maximum credit amount preferably comprises a maximum monetary value which the player can access via the PCAI. Such may comprise, for example, a monetary amount of $500, $1000, $10,000 or other amount. In a preferred embodiment, the maximum credit amount is equal to the value of the collateral which the player provided. However, the maximum credit amount could be more than or less than such the value of such collateral.

The credit access period preferably comprises a period of time during which the player may utilize the PCAI. For example, the credit access period may define a start time, such as 1:00 pm on Mar. 1, 2012, and an end time, such as 1:00 pm on Mar. 31, 2012. Of course, the credit access period may have any range of durations, such as hours, days, weeks, months or the like. In one embodiment, the credit access period might expire based upon certain criteria or be extended based upon certain criteria. For example, a player's credit access period might last 30 days, subject to the player wagering at least $500 in credit per week or the player accessing at least $500 in credit per week from their PCAI (which criteria, if not met, might cause the credit access period to expire early). Another example, is a credit access or availability window which occurs at specific time intervals of the day or night, such as for a defined period of time. For example, a PCAI might have a credit access period from 6 p.m. to 11 p.m. each Wednesday evening between Apr. 1, 2012 and Apr. 30, 2012 (and at no other times on Wednesdays and during no other days of the week).

The redemption or payoff period preferably defines a period of time during which the player may repay all or part of the amount of credit which the player accessed via the PCAI. In one embodiment, the redemption period preferably begins (or has a start time) after the credit access period terminates or expires. As with the credit access period, the redemption period may comprise any range of time.

The settlement terms may comprise terms upon which the PCAI may be settled if it is not redeemed. Such may comprise terms which define how the player's collateral may be used to pay the PCAI. For example, the settlement terms may define the order in which collateral is used to settle the PCAI, the timing of such execution or the like. For example, the settlement terms may define that player issued checks are utilized first, that player bank credit cards are used second, etc. The settlement terms might include interest or other processing charges.

In one embodiment, a record of the PCAI may be created. This record may be physical (such as a paper record) or electronic (such as a data record). The PCAI may be represented by an instrument, such as a paper receipt, though in a preferred embodiment it is simply represented by electronic data. The data record may include information regarding the various characteristics of the PCAI and related accounting information and the like, such as the player provided information, credit check information, the time and date the PCAI was applied for and when it was issued, etc. FIG. 3 illustrates one embodiment of a data file which represents a PCAI. Additional details thereof are provided below.

A player may then begin utilizing the PCAI to obtain credit in accordance with the terms thereof. In a step S5 it is preferably determined if a player is seeking to obtain credit within the credit access period. If so (such as if the PCAI is not expired), then in a step S6, credit may be issued to the player within the credit limit of the PCAI. In one embodiment, a player might access credit only a single time. In a preferred embodiment, however, the player might access credit multiple times, up to an aggregate maximum value which does not exceed the credit limit of the PCAI. In other embodiments, a variety of controls or limitations might be placed upon the PCAI. For example, certain transaction limits might be placed upon the PCAI to address laws associated with money laundering, to reduce the probability of problem gambling, or to address regulatory requirements defined by a particular gaming jurisdiction and the like. For example, in one jurisdiction there may be limits to the type of collateral that may be used, the amount of money that may be available for credit and/or how frequently specific amounts of credit may be accessed within defined time periods or intervals. As another example, a player might be limited to certain daily withdrawal limits or the like. Of course, the particular controls or limitations might depend upon the total amount of credit which is allowed by the PCAI and the duration of the credit access period.

In one embodiment, if the player accesses certain levels or amounts of PCAI funds in certain time periods, one or more triggers may be activated. Such triggers could, for example, freeze the player's account for a period of time to slow the player's access of credit. In one or more embodiments, a notification might be provided to the player about the rate at which they are accessing funds and that the account has temporarily been frozen. In other embodiments, an attendant or the like might be dispatched to find the player and discuss their rate of funds access. The attendant might, depending upon the activities of the player, elect to freeze the player's account for a period of time or permit the player to continue to access funds. In other embodiments, a player may be offered other activities (such as a free or reduced price buffet, a show or the like) in order to engage the player in a secondary activity for a period of time.

As described in more detail below, a player might access credit from the PCAI in various manners. In one embodiment, for example, a player might identify themselves at a casino cage, a kiosk, a gaming machine or other gaming device, and computing or mobile communication devices (desktop or laptop computer, tablet, PDA, etc.). Funds may then be issued to the player in physical form (coins/paper currency/magnetic card/RFID/NFC or other physical media) or in electronic form (electronic credits, land or mobile electronic device accounts or the like), or combinations thereof.

As disclosed herein, if the player has access funds from the PCAI, the player may utilize those funds. In a preferred embodiment, the player may utilize the accessed funds to place one or more wagers, such as at an electronic gaming machine, at a kiosk, on-line (such as for Internet gambling), at a window/cage (such as for sports betting including horse racing and other sports betting) and/or to otherwise participate in or play various games or events. As also disclosed herein, the player might also use the funds for other purposes, such as to pay for other goods or services such as lodging, food or non-gaming entertainment (movies, shows, concerts, etc.). When the PCAI is access for remote play (such as over a network such as the Internet), jurisdictional requirements may require there to be a geo-location validation in addition to user authentication before the credit may be access or used from the PCAI.

Once the PCAI credit access period expires, in a step S7 it is determined whether the player has redeemed the PCAI in the designated redemption period. If so, then the PCAI may be closed or voided, as in step S8. Redemption may occur, for example, by a player paying the full amount of any credit which the player access from the PCAI. As disclosed below, such payment may be accomplished in various manners, such as electronic transfer of funds, payment of coins/currency, redemption of casino chips or by other means of payment.

Of course, if the player does not seek any credit from the PCAI during the credit access period, the PCAI may simply expire or be voided without any requirement of the player redeeming the PCAI.

If the player does not redeem the PCAI (or only partially redeems it), then in a step S9, the PCAI may be settled. This may comprise settling the PCAI in accordance with the settlement terms thereof. Such a settlement preferably comprises steps to obtain monetary funds for paying any remaining unpaid, access credit amount. In a preferred embodiment, the settlement comprises executing upon the collateral which the player provided. For example, if a player accessed $5,000 in credit from the PCAI and made no redemption payment, then steps may be taken to settle the entire $5,000 amount. If the player accessed $5,000 in credit from the PCAI and redeemed $3,000 of that credit, then steps may be taken to settle the remaining $2,000 unpaid credit amount.

As one form of redemption or settlement, a player's outstanding PCAI funds might be (automatically or at the player's election) converted to another financial instrument such as a personal credit line held by a bank or other financial institution. For example, a casino or other PCAI vendor might contract with a bank to offer players a personal credit line. The player might elect to settle their PCAI by that credit line, in which case the bank pays the player's PCAI and then the player is obligated to pay the bank in accordance with the terms of the credit line (which might include interest, minimum monthly payments, etc.). Also, the casino or PCAI vendor might (such as if the player does not redeem the PCAI), sell the debt to a third party which then enforces the terms thereof against the player for payment.

Figure 2:
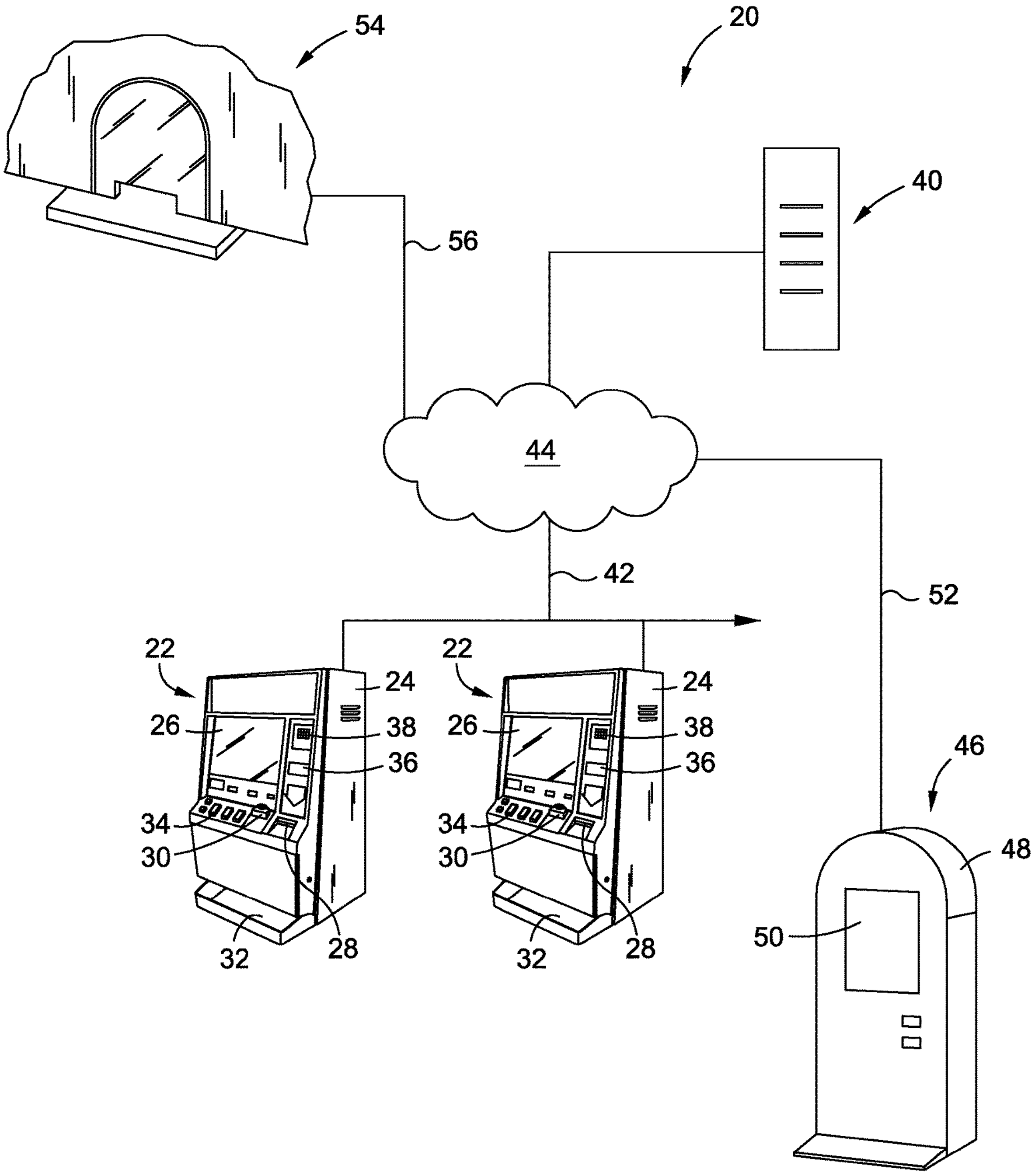
FIG. 2 diagrammatically illustrates a system comprising an environment of the present invention.

As indicated above, the PCAI may be implemented in various manners, including various environments. FIG. 2 illustrates one environment of the present invention, the environment comprising a casino gaming system 20.

In one embodiment, the system 20 includes one or more gaming devices. Such devices may comprise mechanical, electrical or electro-mechanical gaming machines, tables or other devices. For example, the gaming devices may comprise one or more gaming machines 22. Such a gaming machine 22 may have a plurality of features. For example, such a gaming machine 22 may include a housing or cabinet 24 for enclosing/supporting various components of the gaming machine. The housing 24 may have a variety of configurations. In one embodiment, as illustrated, the housing 24 is configured so that the machine has an Aupright@ configuration. The gaming machine 22 might also be configured as a Aslant@-type, Abar-top@ or have other forms.

In one embodiment, the gaming machine 22 may be configured as a "video" type gaming machine, the machine including at least one display 26 for displaying game information to a player. The gaming machine 22 may include other means for providing information to a player. For example, speakers (not shown) or other devices may be provided for generating sound associated with the game. The gaming machine 22 may also include lights, printed instructions and other displays/display devices.

The games presented by the gaming machine(s) may be wagering type games wherein a player must place a bet or wager in order to play the game for the opportunity to receive winnings. Preferably, if the player is a winner of the game, the player is provided an award, such as a monetary payout (such as coins), credits representing monetary value, points or tangible prizes. As illustrated, the gaming machine 22 thus includes a bill validator/acceptor 28 for accepting paper currency and a coin acceptor 30 for accepting coins. Other means of payment, such as a credit card reader, may be provided. An award of winnings in the form of coins may be paid to the player via a coin tray 32.

Preferably, the gaming machine 22 includes means for a player to provide input. In one embodiment, this means comprises one or more buttons. For example, a "spin" or "deal" button 34 may be provided for permitting a player to start a game. One or more wager buttons 34 may be provided for a player to select the amount to bet on a particular game. Other means of input may be provided, such as a touch-screen display and other devices now known or later developed.

A game controller (not shown) is provided for controlling the various devices of the gaming machine and for generating game information. For example, the game controller may be arranged to generate video and audio data for presentation by the display and speakers of the gaming machine 22. The game controller may be arranged to detect a signal from the coin acceptor indicating the receipt of coins or from the bill validator regarding accepted bills and for registering credits corresponding to those inputs, for subtracting credits for wagers placed by a player, and for causing a coin delivery mechanism to deliver coins from a coin hopper to the coin tray 32 for payment of winnings and/or return to a player of unwagered credits. Preferably, the one or more player input devices provide an output to the gaming controller for use in play of the game. For example, in response to a Abet one@ input by a player, the gaming controller is preferably transmitted a signal which causes the gaming controller to initiate presentation of the game.

The gaming machine 22 may include one or more random number generators for generating random game events and results. In other embodiments, game results or information may be generated remotely (such as by a remote game server) and be transmitted to the gaming machine 22.

As indicated, in one embodiment, game information is displayed by a video display 26 to a player. That display may be of a variety of types, including CRT, LCD, plasma and others. The gaming machine 22 may also include more than one video display.

In another embodiment, the gaming machine 22 may include one or more physical reels capable of displaying symbols. In such a configuration, means are provided for rotating the physical reels. In one or more embodiments, the means may comprise a mechanical linkage associated with a spin arm, with movement of the spin arm (a Apull@) by a user causing the reels to spin. In such an arrangement, the reels are generally allowed to free-wheel and then stop. In another embodiment, electronically controlled mechanisms are arranged to rotate and stop each reel. Such mechanisms are well known to those of skill in the art. In this arrangement, actuation of the spin arm or depression a spin button causes a controller (not shown) to signal the activation of the spin mechanism associated with one or more of the reels. Preferably, the controller is arranged to either turn off the signal to the device(s) effecting the rotation of each or all of the reels or generates a signal for activating a braking device, whereby the reels are stopped. As is well known, the combinations of reel positions and their odds of hitting are associated with the controller, and the controller is arranged to stop the reels in a position displaying a combination of indicia as determined by the controller based on the combinations and odds. The principal of such an arrangement is described in U.S. Pat. No. 4,448,419 to Telnaes, which is incorporated herein by reference. For example, the base symbols might be associated with spinning reels. Sets of base symbols might be generated by spinning those reels.

Such gaming machines 22 may have other configurations, including other features. For example, the gaming machine 22 may include a player tracking device, such as a card reader 36 and associated keypad 38. Such player tracking devices are well known and may permit the game operator to track play of players of the gaming machine. The tracked play may be utilized to offer player bonuses or awards.

In one embodiment, the gaming machine 22 may be configured to dispense media, such as printed paper tickets, which have associated value. For example, winnings or unused credits may be returned to the player via a printed ticket having value or associated value. In one embodiment, the gaming machine 22 might also be configured to accept such media for providing credit for game play. Relative to such gaming machines 22, an accounting server (not shown) may be used to generate ticket information to permit the gaming machine to dispense a value cash-out ticket, or to verify such a ticket which is presented at one of the gaming machines 22. Such systems are well known and thus not described in detail herein.

A casino may have numerous such gaming machines 22, such as located on a casino floor or in other locations. Of course, such gaming machines 22 might be used in other environments, such as an airport, a bar or tavern or other locations.

The gaming device(s) may be configured to present a variety of games which are now known or later developed. Such games include, but are not limited to, slot-type games, video slot and video poker games, keno games, bingo games, roulette games, craps games, lottery games, and various other card and dice games, among others.

As used herein, the term "gaming device" is not limited to a gaming machine having the configuration just described, but may include other devices now know or later developed. Such include, but it not limited to gaming tables. Such tables may be manually operated or be fully or partially automated. The gaming devices could also comprise kiosk or terminal type devices, such as for presenting server based games, including bingo and other games and for facilitating sports or other wagering (horse racing, dog racing, sports betting, wagering on stocks or commodities/securities exchanges, etc). The gaming devices might also comprise computing or mobile electronic devices, such as laptop and desktop computers, PDAs, tablets and the like, which devices may be configured to present various wagering events, as well as game servers which are configured to provide information to said electronic devices in order to present such games (such as via a gaming website, by providing game code for download to such devices, etc).

In one embodiment, the wagering games or events might comprise games or events which award points, prizes (free or reduced price goods/services), tickets, non-monetary credits or the like (i.e. non-monetary winnings). The games or other wagering events may comprise intranet and Internet events (such as Internet gaming), including social media games or the like.

In a preferred embodiment, the system 20 also includes one or more system servers 40, such as one or more account servers. Such system servers 40 preferably comprise computing devices which comprise at least one processor for receiving information, processing information or executing code or software, and generating an output, such as control instructions.

In one embodiment, each system server 40 includes means for storing information or instructions. Such means may comprise one or more memory devices. Such might comprise RAM, ROM (including EPROM, EEPROM, PROM) or other devices now known or later developed. In one embodiment, the game server 44 might comprise or be in communication with one or more mass data storage devices, such as one or more hard drives or the like.

The system server 40 preferably also includes at least one communication interface, by which it may receive and transmit information. The communication interface(s) may permit communications in accordance with various protocols (TCP/IP, 802.11xx, etc.) and in various forms and over various types of links (wired and/or wireless).

Each system server 40 might actually comprise a system or network of a plurality of elements or devices. For example, the system server 40 might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the system server 40, such as to change operator settings and the like. The system server 40 might also comprise a router and one or more separate computing devices. The functions of the various computing devices might be segregated.

Although additional details of the system server 40 are described below, in general, the system server 40 is preferably configured to generate a PCAI and store and track information regarding each PCAI. In this regard, the system server 40 may include or communicate with one or more data storage devices. Such devices may store data which pertains to or defines one or more PCAIs.

The system server 40 may also be configured to receive information from one or more external devices and to generate and/or provide responses to such devices, such as the various gaming devices described herein (including gaming machines 22, kiosks, computing devices and mobile communication/electronic devices, among others). For example, the system server 40 may provide a gaming device, such as the gaming machine 22, with financial information, such as a number of monetary credits which have been access by a player from a PCAI. The system server 40 might also receive a request from a remote device, such as a gaming machine 22 or a kiosk (as detailed below) from a player who wishes to access their PCAI and obtain funds there from, and then respond to such a request.

In this regard, the one or more gaming machines 22 or other gaming devices are in communication with the one or more system servers 40 at one or more times. For example, the gaming machines 22 and the one or more system servers 40 may be linked via one or more communication links 42. These communication links 42 may be wired and/or wireless and may be dedicated, shared, part of a LAN, WAN or other network, such as an internal casino network 44.

The system 20 preferably also comprises at least one kiosk 46. The kiosk 46 may have various configurations. In one embodiment, the kiosk 46 comprises a housing 48, one or more devices for receiving player input and/or displaying or otherwise providing information to a player, and at least one credit dispensing mechanism. The information input/output devices may include, for example, an electronic touch-screen video display 50. Other input/output devices may include one or more push-buttons, keypads, keyboards and/or other elements. The credit dispensing mechanism may comprise, but it not limited to one or more of: a currency dispenser, a coin dispenser, a ticket or other media dispenser (such as a magnetic card dispenser), or a media writer (such an RFID encoder or the like).

In one embodiment, the kiosk 46 includes at least one processor for executing machine readable code or software, and at least one memory device for storing machine readable code or software for execution by the processor. In one embodiment, the kiosk 46 includes at least one communication interface, such as for establishing a communication link 52 with one or more other devices, such as the system server 40 and/or the gaming devices, such as the gaming machines 22.

Also, the system 20 may include one or more accounting or user stations. For example, the system 20 may include a computing station which is associated with a casino cage 54 (i.e. a physical location at a casino or similar location) or other location, such as a call or electronic request processing center (such may comprise a remote processing center at which telephone calls or electronic requests may be received from players). The casino cage computing station may comprise a computing device such as a terminal, laptop or desktop computer. Such devices are well known in the art. The casino cage computing station may be configured to communicate with one or more other devices of the system 20, such as via a communication link 56.

Additional aspects of the system 20 will be appreciated from examples of use thereof as described below.

One example of the invention will now be described with reference to FIG. 2. In one embodiment, a player may apply for a PCAI. The player might submit information to a casino employee at the casino cage 54, such as by submitting an application to the employee. The employee may provide the information to the system 20 via their casino cage computing station. In one embodiment, the information may be transmitted to the system server 40 for processing, including storage of the information in one or more data files.

In an alternate embodiment, it is possible that the player may submit the required information electronically, such as by entry of the information to the kiosk 46 or by another device, such as a home or work computer or a mobile electronic device (phone, PDA, tablet, etc.). In the latter case, the player might submit the information to a webpage which is supported by the system server 40 or a web server which is associated therewith.

As indicated above relative to FIG. 1, in one embodiment the player preferably provides information regarding collateral. The casino preferably utilizes the player identity and collateral information to determine whether to issue the PCAI. In one embodiment, the system server 40 may create a player account and associate a player's information with that account. Such an account may be the same as, or be linked to, a player reward/tracking account which is associated with a casino's player loyalty program (such programs are well known in the art). Thus, if the player is issued a PCAI, the player may access their PCAI via their account. The player might, for example, access their account by way of a magnetic stripe player tracking card and associated password or other player identification information.

In one embodiment, a player might access credit from their PCAI at the casino cage 54, a kiosk 46 or even directly at a gaming device, such as a gaming machine 22. For example, if the player might travel to the casino cage 54, provide identification information, and request monetary funds from their PCAI. The employee of the casino cage 54 may access the player's account and enter a request for funds. If the funds request meets the requirements of the PCAI (as indicated in FIG. 1, such may comprise, for example, that the funds are accessed during an access period and are less than the maximum credit limit), then the employee may dispense coins/currency or monetary equivalent (such as a printed ticket or a magnetic stripe value card, RFID tag or other media) to the player, or the player's account might be credited with monetary credits (which the player can then use at a gaming device, for example, by accessing their account). The player may then utilize those funds, such as at a gaming device for use in placing wagers.

Likewise, a player might request funds at a kiosk 46. The player might, for example, use a graphical user interface at the kiosk 46 to identify themselves and then seek funds. For example, the graphical user interface might instruct the player to enter identification information. The kiosk 46 may transfer that information to the system server 40 and the system server 40 may send information back regarding the amount of fund, if any, that the player can access. The kiosk 46 may then cause the graphical user interface to display information regarding the amount of accessible funds. The player may then provide a request for funds based upon that information. The kiosk 46 may then dispense funds (such as coins/currency) or monetary equivalent to the player, or the player's account might be credited with monetary credits.

In yet another embodiment, it is possible that a gaming device may be configured to accept player information and process a player's request for funds from a PCAI. For example, a player might insert their player card into a card reader of the gaming machine 22 and then access their account. Again, a graphical user interface or the like may be used to accept a request for funds from the player at the gaming machine 22. In one embodiment, if the funds are approved, monetary credits which are equal to the requested funds may be credited directly to the gaming device for use by the player.

In one preferred embodiment of the invention, funds which are accessed from a PCAI by a player are associated with the player's account in the form of credits. For example, a player may access $1000.00 from a $5000.00 limit PCAI. The $1000.00, if approved, may be associated with the player's account. The player may then use those credits at a gaming device, such as by providing their account information to the device. For example, the player might insert their player card into a card reader at a gaming machine 22 and then provide their password. The gaming machine 22 might communicate this information to the system server 40 which may then respond that the player has $1000.00 in funds associated with their account. The gaming machine 22 may then display a number of usable monetary credits to the player (for example, if the player wishes to play a game which utilizes credits having a value of $0.50, the gaming machine 22 would indicate the availability of 2000 credits to the player. In other embodiments, the system 20 or gaming machine 22 might limit the transfer of funds. For example, if the maximum wager or buy-in for a game at a gaming machine 22 is $25, the system 20 or gaming machine 22 might limit transfers from the PCAI or the player's account to $25.

In one embodiment, requests for funds and funds processing may occur via the system server 40 (or another device, such as an accounting system/server or the like). For example, the system server 40 may store information regarding a player's PCAI and information regarding the associated credit limit, funds which have been issued and the remaining credit balance, among other information. In this manner, information regarding a player's PCAI is centralized and can be accessed via different devices and users which are associated with the system 20.

FIG. 3 illustrates one example of a PCAI having the form of a data record. As illustrated, the PCAI may have various characteristics or associated information. In the example illustrated, the instrument has: (1) an identification code or number 100; (2) information regarding the player's identity, such as their name 102, social security number, a biometric (such as a fingerprint/retinal scan/picture, etc.); (3) the player's account or card number 104; (4) the player's password 106; (5) the credit limit for the particular PCAI 108; (6) an identification of the collateral which the player provided to obtain the PCAI 110; (7) the credit access period 112; (8) the amount of credit used and/or remaining 114; (9) the redemption period 116; and (10) settlement information, such as the timing of settlement and/or the order of collateral to be used 118. Of course, the PCAI might have other associated information. As indicated, such information may comprise stored data which is accessible by a system server 40.

In one embodiment, multiple PCAIs may be associated with a single player. In one embodiment, one or more of those PCAIs may be open at the same time. FIG. 4 illustrates one example of a player account for a player. As illustrated, the player has three PCAIs. One PCAI is open, one is closed, and another is in settlement. Of course, additional details regarding each PCAI might be provided by an associated PCAI record. As also illustrated, the player's main account may indicate the amount of funds which the player currently has in their account (i.e. issued from a PCAI and/or otherwise provided by the player or the like), which funds may be used as credits at a gaming device. It is also possible for multiple PCAIs to have linked features or elements. For example, a player may have three PCAIs which each individually provide a credit limit of $10,000, but where the player has an overall credit cap of $25,000 that can be access from any of the three PCAIs in total.

Of course, the PCAI and player account information may be generated, stored and tracked in other manners.

A player may access or be provided with information regarding their PCAI at one or more times. For example, when a player accesses their account they may be provided information regarding when a PCAI is set to close (i.e. after which no additional funds can be accessed), the amount of the credit limit of the PCAI, the amount of fund which have been issued from the PCAI and, for a PCAI which is closed, the time that the player has to redeem the PCAI. For example, relative to FIG. 4, a player might access their account to determine the status of each PCAI. A player might select a particular PCAI to obtain more detailed information, such as a detailed PCAI record as shown in FIG. 3.

In addition, when a PCAI redemption period is set to open, a player may be notified so that the player is aware that the redemption period is open or about to open. Such a notification may be via a player's account, but might be by other means, such as via text message, email, paper mail, phone or otherwise.

As indicated above relative to FIG. 1, in one embodiment a player may redeem a PCAI by paying back any funds which were accessed from the PCAI. For example, a player might provide monetary funds (coins/currency), electronic funds (from a credit, debit or stored value card or bank account), monetary equivalent (casino chips or credits), or combinations thereof, to the PCAI issuer. For example, such funds might be provided by the player to an employee at the casino cage 54, to the kiosk 46 or the like (including by electronic transfer from another device, such as by transfer effected from a player's home computer as to their bank account). Such funds are preferably input to the system 20 and tracked by the system server 40. As indicated above, if the PCAI is fully redeemed, it is preferably closed and notice thereof (such as via a printed or electronic receipt/confirmation) may be provided to the player. If the PCAI is not redeemed in full, then it may be settled in the manner described herein.

Additional aspects of the invention will be appreciated from the following example transactions.

As one aspect of the invention, if the player does not utilize their entire credit limit, the player may be paid funds up to the credit limit at the close of the credit access period. This allows, for example, the player immediately use those funds while the PCAI may be paid back over time (for example, if the player provided a credit card as collateral, though the player obtained all of the PCAI credit limit funds immediately, the PCAI may be settled via the player's credit card but the player may not be required to pay the credit card balance back immediately).

In one embodiment, a player may indicate an order that collateral should be utilized for settlement of the PCAI. For example, a player might be provided with a $10,000 PCAI limit based upon collateral comprising a $5,000 personal check and a $5,000 credit card limit. If the player accesses only $5,000 of their PCAI limit, they might designate either their personal check or their credit card to be utilized to settle the PCAI.

Of course, in other embodiments, the settlement order may be dictated by the PCAI issuer or by the nature of the collateral. For example, in the above example, if the player accessed $6,000 in PCAI funds, then the player might be required to utilize their $5,000 personal check first and then the credit card (because it is not possible for the PCAI issuer to cash the check for other than the $5,000 amount). Also, the PCAI issuer might dictate settlement order based upon the risks associated with the collateral.

In one embodiment, a player may redeem a PCAI using their collateral or via other payment. For example, a player might provide a $2,000 personal check as collateral for a $2,000 PCAI. At the time of redemption, the player might utilize their bank credit card in order to redeem funds accessed from the PCAI. In that event, the collateral is returned/closed along with the PCAI.

In one embodiment, the collateral may be executed upon only during the settlement period. However, in other embodiments, the collateral might be accessed at any time or during specified times.

Of course, the process of settlement might include various legal mechanisms (such as repossessing physical goods (e.g. car used as collateral), garnishment or the like). In one embodiment, if a player does not redeem their account and/or the player's account cannot be settled in the normal course, the additional or other actions might be taken, such a freeze upon the issuance of any new PCAIs to the player, a freeze on any winnings or rewards to the player, etc.

The system and method of the invention might be implemented directly by a game operator such as a casino or by a vendor. In one embodiment, one or more vendors might provide PCAI funds to players for use at specific locations (such as at different casinos). Alternatively, a casino or vendor might implement a centralized system which allows players to utilize funds at multiple locations, including more than one casino or on-line.

In one embodiment, the game operator (e.g., casino) might underwrite or provide the PCAI funds (either directly, if the casino implements the system, or to a vendor which operates the system). In other embodiments, funds might be underwritten or provided to the casino or PCAI vendor via a third party, such as a third party bank.

In one configuration, various systems may be linked. For example, a casino may operate a casino system such as that illustrated in FIG. 2. In such a configuration, the system server 40 might comprise a player tracking server having associated player tracking or other player accounts. The casino's system might link to a credit issuer system. Such a system might be operated by an entity which processes casino credit applications and provides funds. Such an entity might be a lender or might simply be a processing entity which obtains funds from one or more third party lenders such as banks. The credit issuer system might include one or more computing devices, such as servers, for creating and managing the PCAIs. In one configuration, a casino might forward credit applications to the credit issuer or the player might apply for credit online, such as through the casino system or directly to the credit issuer. For example, the credit issuer might operate one or more the kiosks and those kiosks might link to the credit issuer system via the casino system, or directly. When credit is accessed by a player, information regarding the provided credit may be forwarded from the credit issuer system to the casino system. For example, information regarding accessed funds might be transmitted from the credit issuer system to the casino's system server 40, where the accessed funds are associated with the player's tracking account. The player may then access those funds from the casino system via their account (such as by using their player tracking card). In this manner, the overhead associated with issuing and managing the PCAIs, as well as any risk of loss, may be shifted to a credit issuer from the casino.

As indicated herein, in one embodiment, PCAI funds might be used for gaming and non-gaming purposes. In one preferred embodiment, PCAI funds for these two purposes might be separated or segregated. For example, a PCAI credit limit might be separated between such uses, such as determined by the player or the vendor. As one example, a player might be provided a $5000 credit limit, of which $3000 might be used for non-gaming purposes and $2000 for gaming purposes. In one embodiment, the PCAI might then be configured with two separate accounts or the like, whereby the player accesses the funds separately. As one example, a player might be issued two different associated media or cards. The player might utilize the first card to access funds for gaming purposes (such as a gaming device) and a second card to access funds for non-gaming purposes. In such a configuration, the system 20 of the invention may be configured to track or monitor the player's access and use of funds. Further, the redemption or settlement terms for the different credit portions might vary. As one example, interest might be charged on non-gaming credit which is not redeemed by the player but interest may not be charged on gaming credit which is not redeemed by the player.

In one embodiment, there may be optional controls or other features for a PCAI, such as features which may be enabled or disabled by a casino or lender. For example, the system may be configured to prevent a player from cashing out a monetary amount from a gaming machine or a gaming system if the player has an outstanding credit balance. For example, if a player has accessed $1000 in credit from a PCAI, the player might be permitted to utilize that credit to place wagers at a gaming machine but might be prevented from cashing out credits or monies from the gaming machine, such as in the event of a game win, until or unless all accessed funds are redeemed or paid. In this embodiment, any retained monetary amount or winnings might be applied first to any un-redeemed PCAI amounts associated with the player. For example, in this example, if the player had accessed $1000 in PCAI credit and had accumulated a total of $1500 in credits at a gaming machine, the player might be prevented from cashing out the $1500. Instead, upon a cash-out signal from the player, $1000 of the credits might be applied to the player's PCAI balance to redeem it and then the remaining $500 might be paid to the player. Such a feature might be implemented via the system 20 of the invention, such as by communications between the server(s) and gaming machines.

As one aspect of the invention, if a player has an outstanding PCAI balance which is unredeemed or unsettled, then the player's gaming activities may be tracked and any winnings awarded to that player might be applied to the player's PCAI. As one example, a player might have accessed and lost $1000 in PCAI credit during a gaming session. The player did not redeem the PCAI and the casino must not settle the PCAI. The player then begins a second gaming session using their own funds and wins $1500.00. The player may be identified by their player tracking I.D. or account and, when matched against their unpaid PCAI balance, the system 20 may cause the gaming machine to prevent the player from cashing out their new winnings. Instead, winnings up to the amount of the PCAI balance may be paid from the winnings.

In accordance with one embodiment of the invention, a PCAI credit access period may remain open only if certain criteria are met. For example, a PCAI credit access period might be 6 months but only remain open on a monthly basis so long as the player's credit-worthiness is confirmed at the end of each month. If, for example, the player's credit-worthiness declined, the credit access period might close automatically at the end of that month or it might be immediately closed.

In an embodiment in which a vendor, such as a processor or lender, provides PCAI funds or implements the system, the casino and/or player might be charged for the service. For example, if a player sought a $10,000 PCAI credit limit via a casino, the PCAI vendor might charge the casino a 2% transaction fee or might charge the player the transaction fee (in the case of the player, the fee might be deducted from the credit limit as accessed credit or which fee may need to be paid separately by the player). The type and nature of the fees might vary. For example, there might be an origination or issuance fee for the PCAI (there could also be an application fee which is charged to the player to simply apply for a PCAI, regardless of whether the PCAI is actually issued). There might instead or additionally be access or transaction fees. As indicated, the fees might be charged to or paid by the casino or the player. As one example, a player might be charged an origination fee for a PCAI and then be charged a transaction fee each time they access funds from the PCAI. These fees might be a fixed amount or be a percentage of the PCAI or accessed funds or the like. Further, the amount of the fees might vary depending upon various criteria including, but not limited to, the size of the PCAI credit limit, the amount of funds access, the player's credit-worthiness or various other criteria. In one embodiment, a casino might pay the origination fee for a highly valued player, such as based upon a level of play by the player. A casino might also pay the transaction fees, such as when the player accesses funds at the casino (for example, a player might obtain a PCAI that is usable at multiple casinos and a particular casino might reward the player for accessing and using funds by waiving or paying any transaction fees).

In certain embodiments, a player might be permitted to select a PCAI from various PCAIs having different terms. Those terms might include various features such as, but not limited to: PCAI credit limit, interest rate on unpaid accessed credit, a PCAI access fee, cash back to the player (for example, if a player elects to utilize credit, the player might be awarded a cash back award, such as a percentage of accessed credit, which cash back might be added to the funds which are provided to the player or might be separately paid or awarded to the player), point or other awards (such as are common with credit cards). Set forth below is one example:

Option 4: Credit Amount $15000 Rate: 22% Cash back 5% Access Fee $w

Option 3: Credit Amount $10000 Rate: 18% Cash back 1% Access Fee $x

Option 2: Credit Amount $5000 Rate: 15% Cash back 0.1% Access Fee $y

Option 1: Credit Amount $1000 Rate: 10% Cash back 5% Access Fee $z

In an Example 1: the player desires $10,000 and thus chooses PCAI Option #4 (and thus pays a 22% interest rate on any unredeemed credit, gets 5% Cash Back, and pays Access Fees of $w). In an Example 2: the player desires $5,000, then asks for $5,000 more, then asks for $5,000 more within a specific time interval and thus chooses PCAI Option #2, then chooses PCAI Option #3 (and thus pays a 15% interest rate on any unredeemed credit from Option #2 and 18% on Option #3 and pays Access Fees of $y+$x). In yet another example, a player desires $500, then $1,000 more, then $5,000 more within a specific time interval and thus chooses PCAI Option #1, then PCAI Option #2, then PCAI Option #3 (and thus is subject to the indicated interest rates, receives the indicated Cash Back percentages and pays total Access Fees of $z+$y−$x).

The invention has a number of advantages. First, the PCAI of the invention provides a player with greater flexibility in accessing funds for use in gaming activities. Among other things, the PCAI comprises a source of funds which a player can access to fund gaming activities. In its preferred configuration, the PCAI has a defined credit access period. This period is useful to a casino because it limits the time that the casino has to keep the credit available to the player. At the same time, this time period also aids the player because the player has a time certain after which they may not access additional funds and upon which the funds must be repaid. Thus, the PCAI has "closure" for the player, aiding greatly in their management of casino spending.

Another important aspect of the invention is that the PCAI is preferably collateral supported. Thus reduces the risk (such as from a casino's perspective) in issuing the credit to the player. At the same time, the PCAI provides the player with great flexibility in how to redeem or settle issued credit. For example, a player can voluntarily redeem the PCAI or the player can define the timing and/or order of collateral to be used to settle the PCAI.

The redemption period of the PCAI is beneficial because it not only provides a player with time to voluntarily redeem the PCAI, but defines a time point after which the casino may settle the PCAI. Thus, the casino knows when a PCAI will close and thus knows when it can take steps to settle the PCAI, which again provides greater control/certainty over the payment process.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A gaming system comprising:

a memory storing one or more jurisdiction specific rules;

a server comprising a processor, a memory and machine-readable code stored in said memory and executable by said processor to cause said processor to:

accept an application for credit from a player, said application including information identifying said player;

process said application comprising determining if at least one qualifying criteria for issuance of a casino credit instrument has been met and if so, issuing said casino credit instrument comprising generating a casino credit instrument record which comprises information which identifies said casino credit instrument, and characteristics of said casino credit instrument which conform to said one or more jurisdiction specific rules stored in said memory, including an amount of available credit up to a maximum credit limit;

storing said record in said memory;

receiving a request for access to funds from said casino credit instrument via an input provided by said player to an input device of a gaming machine;

transmitting, to said gaming machine, instructions to cause said gaming machine to associate one or more monetary value credits with a credit balance at said gaming machine, said funds derived from said available credit of said casino credit instrument, up to said maximum credit limit, wherein said transferred funds creates an unpaid balance associated with said casino credit instrument.

2. The system in accordance with claim 1, wherein said characteristics comprise a maximum amount of funds which may be accessed from said casino credit instrument during a period of time.

3. The system in accordance with claim 1, wherein when said request does not comply with said characteristics, freezing access to said available credit associated with said casino credit instrument.

4. The system in accordance with claim 1, wherein said one or more jurisdictional rules comprise jurisdictional transaction limits.

5. The system in accordance with claim 1, wherein said characteristics comprise a daily transaction limit.

6. The system in accordance with claim 1, wherein said unpaid balance of said casino credit instrument comprises an amount of said funds accessed from credit limit, less any payments thereto.

7. The system in accordance with claim 1, wherein said request for access to funds comprises information regarding an identity of said player comprising information associated with a player loyalty account.

8. The system in accordance with claim 1, wherein said characteristics comprise at least one of: a type of collateral, a credit access period defining a time period during which credit may be access, a redemption period, settlement provisions and redemption provisions.

9. The system in accordance with claim 1, wherein said server is operated by a vendor of a casino which operates said gaming machine and said server communicates with said gaming machine via at least one casino system.

10. A method of providing casino credit to a player, relative to a gaming system, comprising the steps of:

accepting an application for credit from a player, said application including information identifying said player;

storing, in a memory, one or more jurisdiction specific rules;

processing, via a server comprising a processor, a memory and machine-readable code stored in said memory and executable by said processor, said application comprising determining if at least one qualifying criteria for issuance of a casino credit instrument has been met;

if so, issuing said casino credit instrument comprising generating, via said processor of said server, a casino credit instrument record which comprises information which identifies said casino credit instrument, which information comprises characteristics which conform to said one or more jurisdiction specific rules stored in said memory, including an amount of available credit up to a maximum credit limit;

storing said record in said memory associated with said server;

receiving a request for access to funds from said casino credit instrument via an input provided by said player to an input device of a gaming machine;

transmitting, to said gaming machine, instructions to cause said gaming machine to associate one or more monetary value credits with a credit balance at said gaming machine, said funds derived from said available credit of said casino credit instrument, up to said maximum credit limit, wherein said transferred funds creates an unpaid balance associated with said casino credit instrument; and permitting said player to wager said monetary value credits which are associated with said credit balance at said gaming machine.

11. The method in accordance with claim 10, wherein said characteristics comprise a maximum amount of funds which may be accessed from said casino credit instrument during a period of time.

12. The method in accordance with claim 10, wherein when said request does not comply with said characteristics, freezing access to said available credit associated with said casino credit instrument.

13. The method in accordance with claim 10, wherein said one or more jurisdictional rules comprise jurisdictional transaction limits.

14. The method in accordance with claim 10, wherein said characteristics comprise a daily transaction limit.

15. The method in accordance with claim 10, wherein said gaming machine comprises a housing, at least one video display configured to display game information, at least one player input device and at least one gaming machine controller.

16. The method in accordance with claim 10, wherein said request for access to funds comprises information regarding an identity of said player.

17. The method in accordance with claim 16, wherein said information regarding said identity comprises a player tracking identifier.

18. The system in accordance with claim 10, wherein said one or more jurisdiction specific rules relate to a type of collateral which may be utilized for said casino credit instrument and said characteristics comprise collateral provided by said player which meets said type of collateral.

* * * * *